(12) United States Patent
Yano

(10) Patent No.: US 11,435,595 B2
(45) Date of Patent: Sep. 6, 2022

(54) IMAGE DISPLAY APPARATUS

(71) Applicant: SONY CORPORATION, Tokyo (JP)

(72) Inventor: Tomoya Yano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 94 days.

(21) Appl. No.: 17/056,586

(22) PCT Filed: Apr. 18, 2019

(86) PCT No.: PCT/JP2019/016600
§ 371 (c)(1),
(2) Date: Nov. 18, 2020

(87) PCT Pub. No.: WO2019/225233
PCT Pub. Date: Nov. 28, 2019

(65) Prior Publication Data
US 2021/0218951 A1 Jul. 15, 2021

(30) Foreign Application Priority Data

May 25, 2018 (JP) .............................. JP2018-100650

(51) Int. Cl.
*H04N 13/32* (2018.01)
*H04N 13/351* (2018.01)
(Continued)

(52) U.S. Cl.
CPC ........... *G02B 30/24* (2020.01); *G02B 26/101* (2013.01); *G02B 30/33* (2020.01); *G03B 21/60* (2013.01);
(Continued)

(58) Field of Classification Search
CPC .... H04N 13/32; H04N 13/351; H04N 13/363; G02B 30/33; G02B 26/101
(Continued)

(56) References Cited

U.S. PATENT DOCUMENTS 4,943,145 A * 7/1990 Miyata .................... G09F 13/20
348/203
5,694,235 A 12/1997 Kajiki
(Continued)

FOREIGN PATENT DOCUMENTS

EP 0796453 A1 9/1997
JP 08-256359 A 10/1996
(Continued)

OTHER PUBLICATIONS

International Search Report and Written Opinion of PCT Application No. PCT/JP2019/016600, dated Jul. 9, 2019, 09 pages of ISRWO.

*Primary Examiner* — Jeffery A Williams
(74) *Attorney, Agent, or Firm* — Chip Law Group

(57) ABSTRACT

An image display apparatus of the present invention includes: a beam emitting section (10) that radially emits a plurality of beams (Ls1 to Ls5) in a horizontal direction; a mirror rotary member (20) having a rotation axis (Pc) and an inner surface, the inner surface having a plurality of mirror surfaces (21) that reflects each of the plurality of beams (Ls1 to Ls5), the mirror rotary member as a whole rotating about the rotation axis (Pc) as a center to thereby perform, by the plurality of mirror surfaces (21), scanning with each of the plurality of beams (Ls1 to Ls5) emitted from the beam emitting section (10) in the horizontal direction; and a screen (2) to be irradiated with the plurality of beams (Ls1 to Ls5) with which the scanning is performed by the plurality of mirror surfaces (21).

15 Claims, 15 Drawing Sheets

(51) Int. Cl.
| | |
|---|---|
| *H04N 13/363* | (2018.01) |
| *G02B 30/33* | (2020.01) |
| *G02B 26/10* | (2006.01) |
| *G02B 30/24* | (2020.01) |
| *H04N 13/322* | (2018.01) |
| *H04N 13/383* | (2018.01) |
| *H04N 13/398* | (2018.01) |
| *G03B 21/60* | (2014.01) |

(52) U.S. Cl.
CPC ........... *H04N 13/32* (2018.05); *H04N 13/322* (2018.05); *H04N 13/351* (2018.05); *H04N 13/363* (2018.05); *H04N 13/383* (2018.05); *H04N 13/398* (2018.05)

(58) Field of Classification Search
USPC .......................................................... 348/54
See application file for complete search history.

(56) References Cited

U.S. PATENT DOCUMENTS

| | | | |
|---|---|---|---|
| 5,903,304 A | 5/1999 | Deter | |
| 2006/0023285 A1 | 2/2006 | Lai | |

FOREIGN PATENT DOCUMENTS

| | | | |
|---|---|---|---|
| JP | 10-510637 A | 10/1998 | |
| JP | 2010-032952 A | 2/2010 | |
| WO | 97/014074 A1 | 4/1997 | |

\* cited by examiner

[FIG. 1]
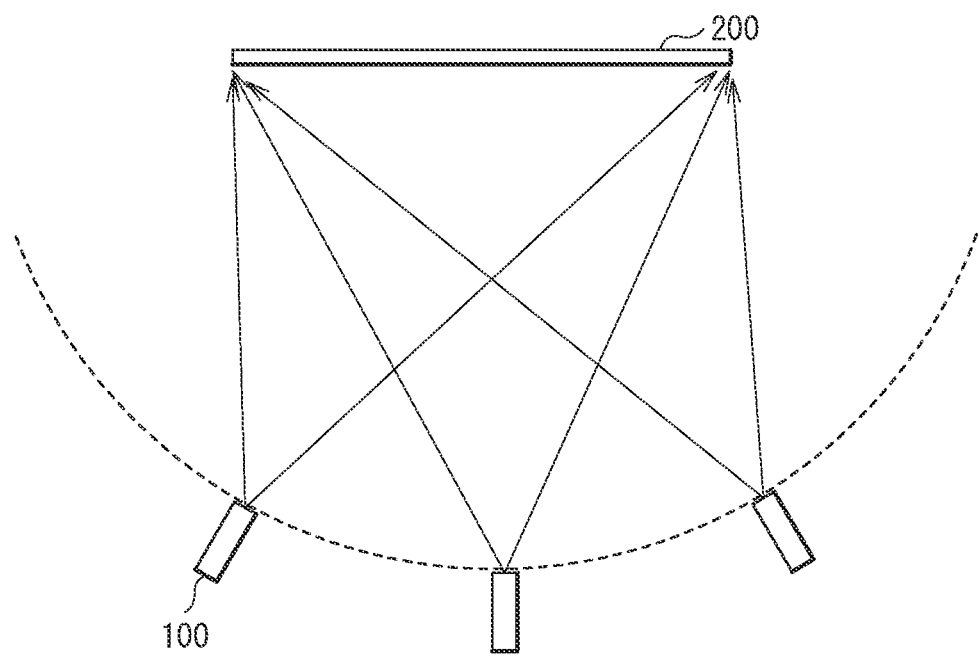

[FIG. 2]
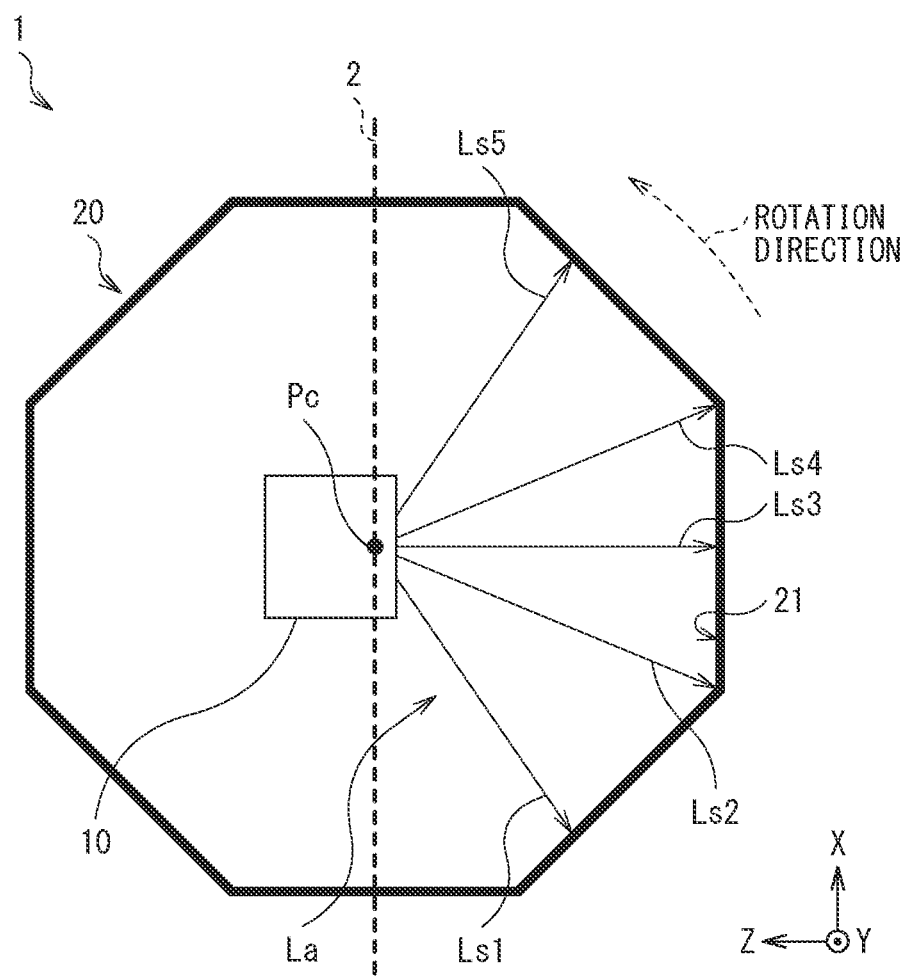

[FIG. 3]
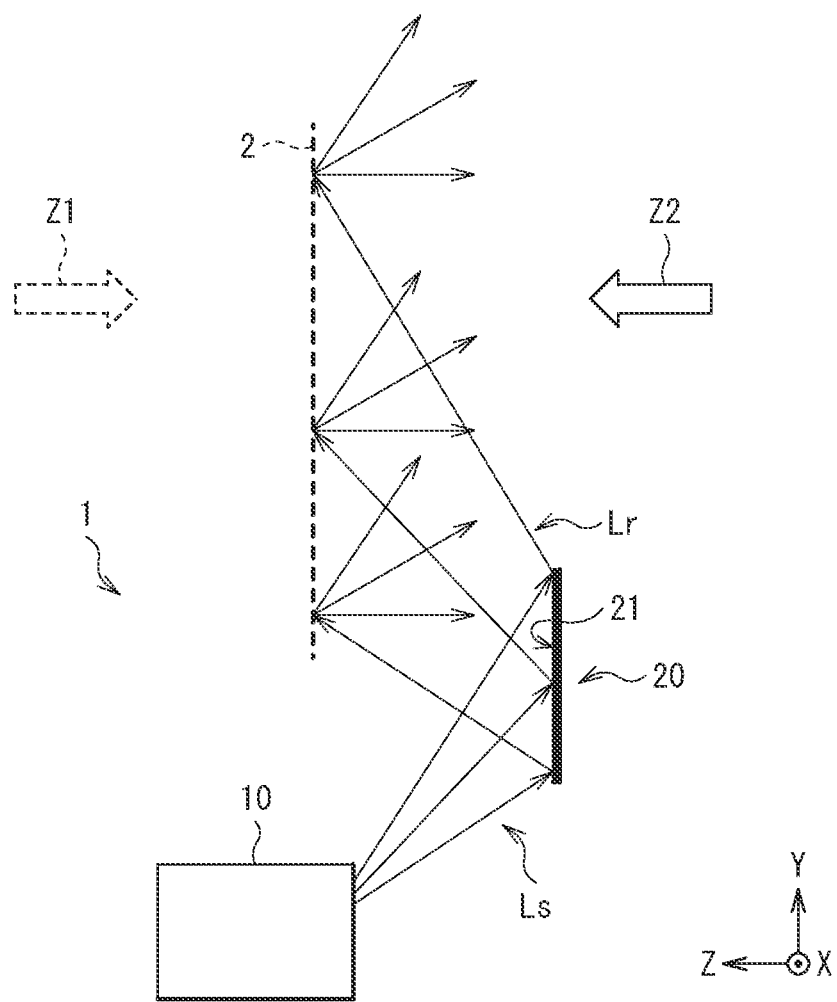

[FIG. 4]
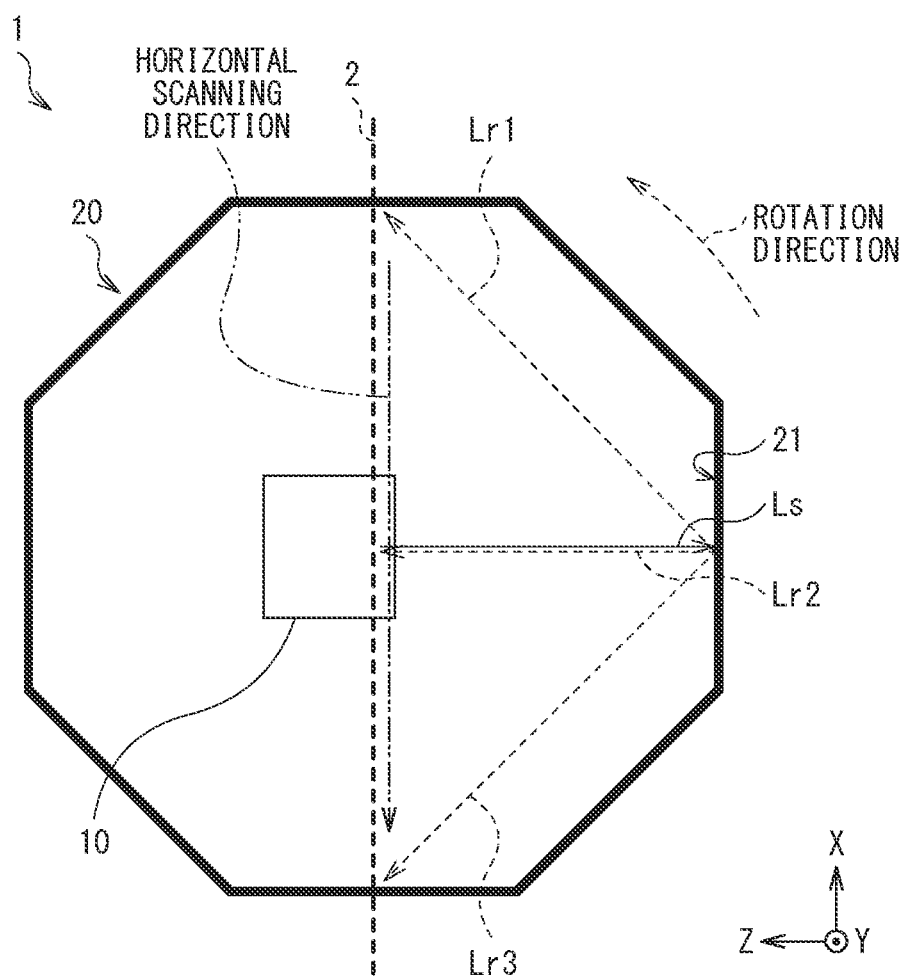

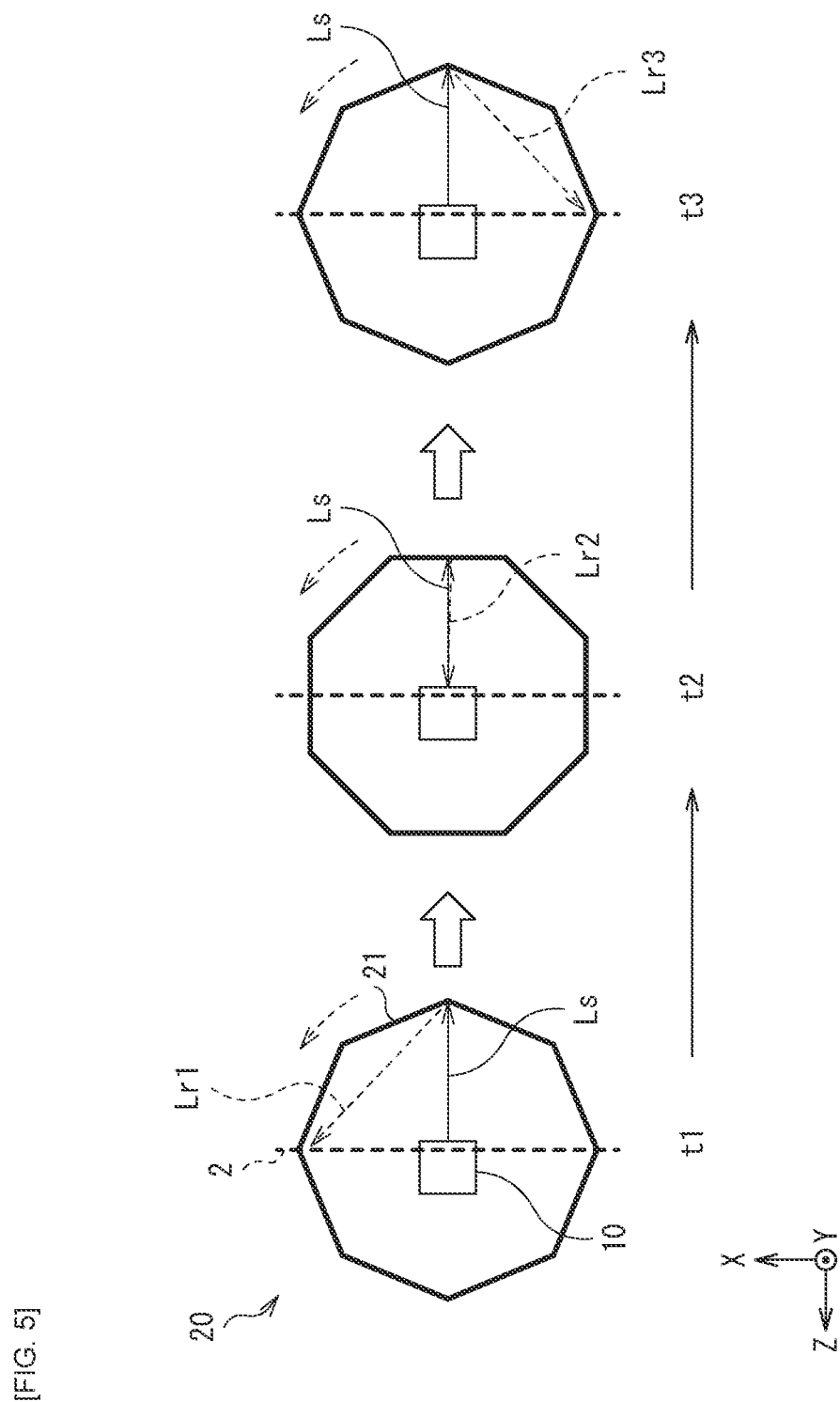

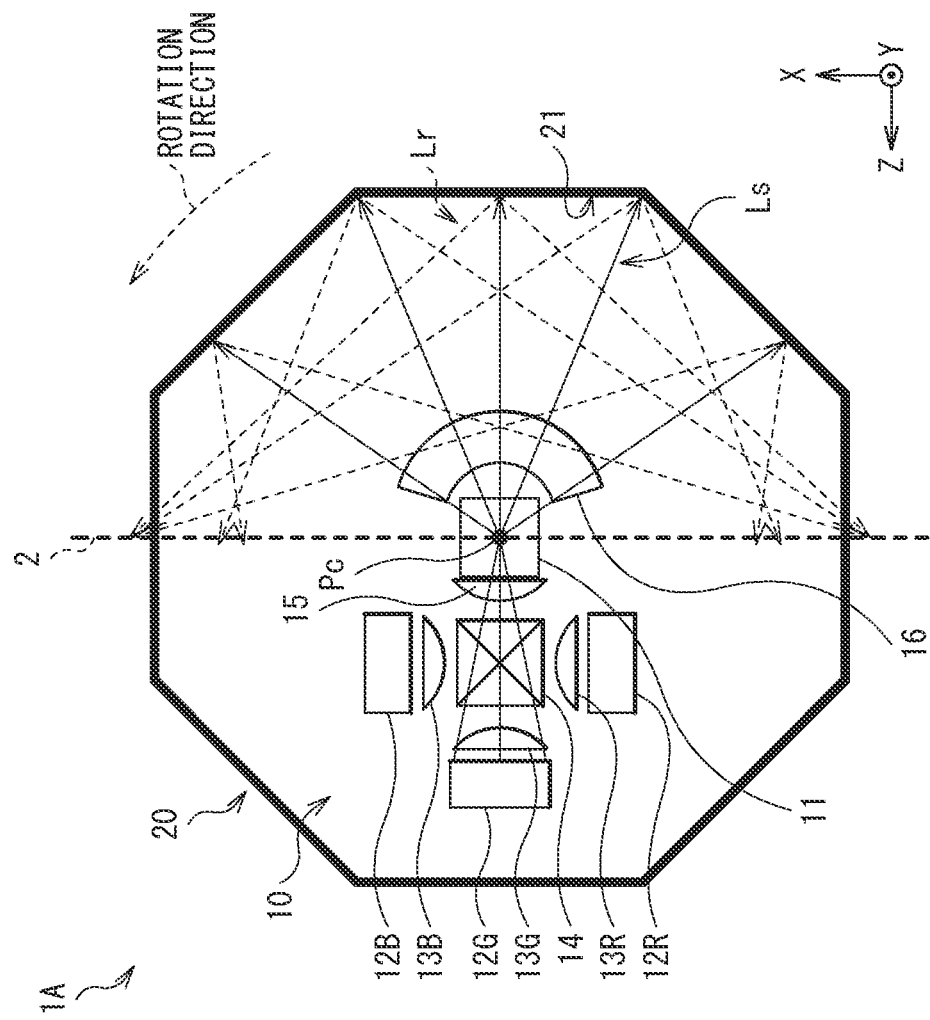

[FIG. 7]
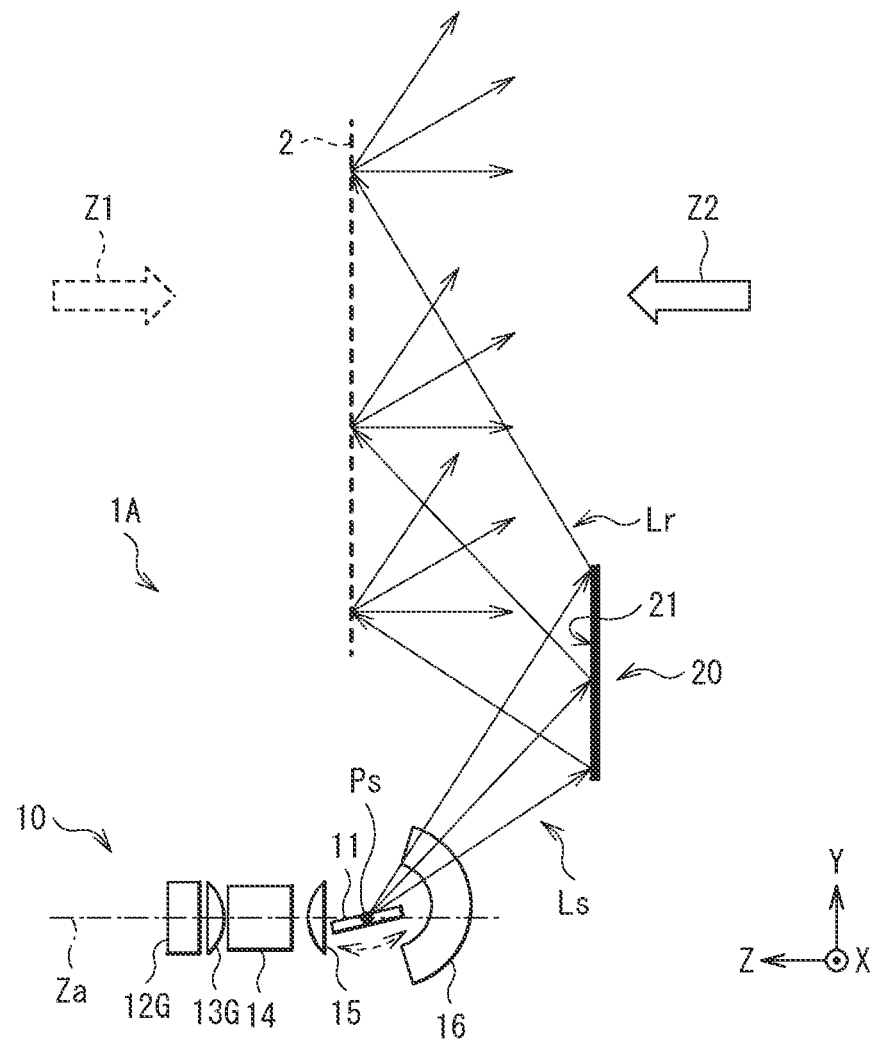

[FIG. 8]
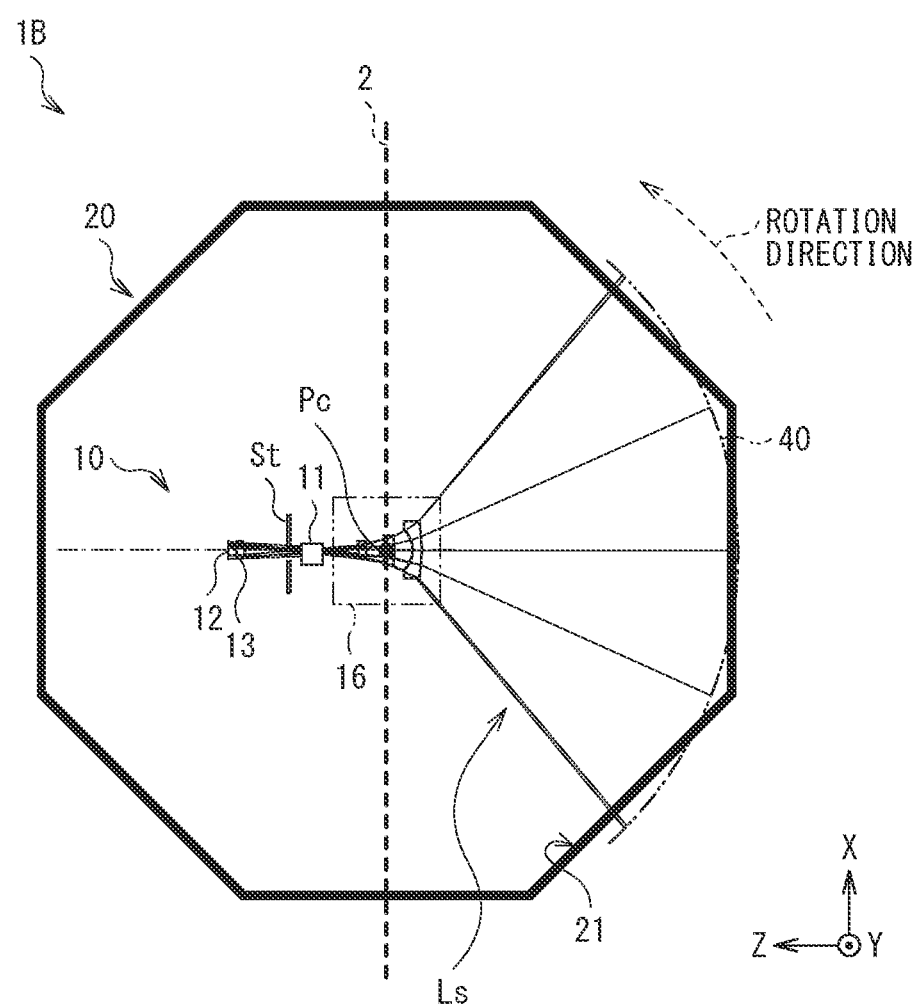

[FIG. 9]
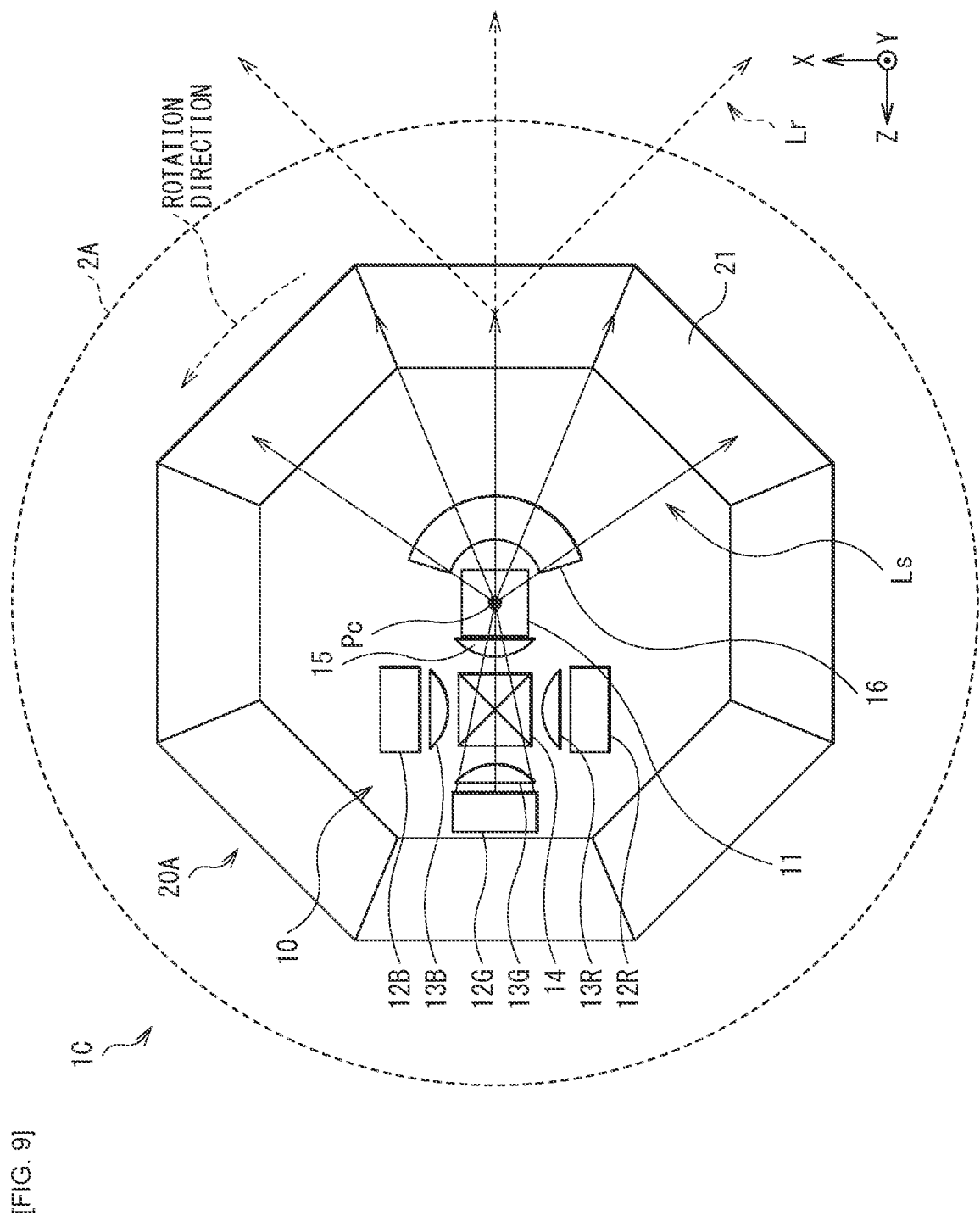

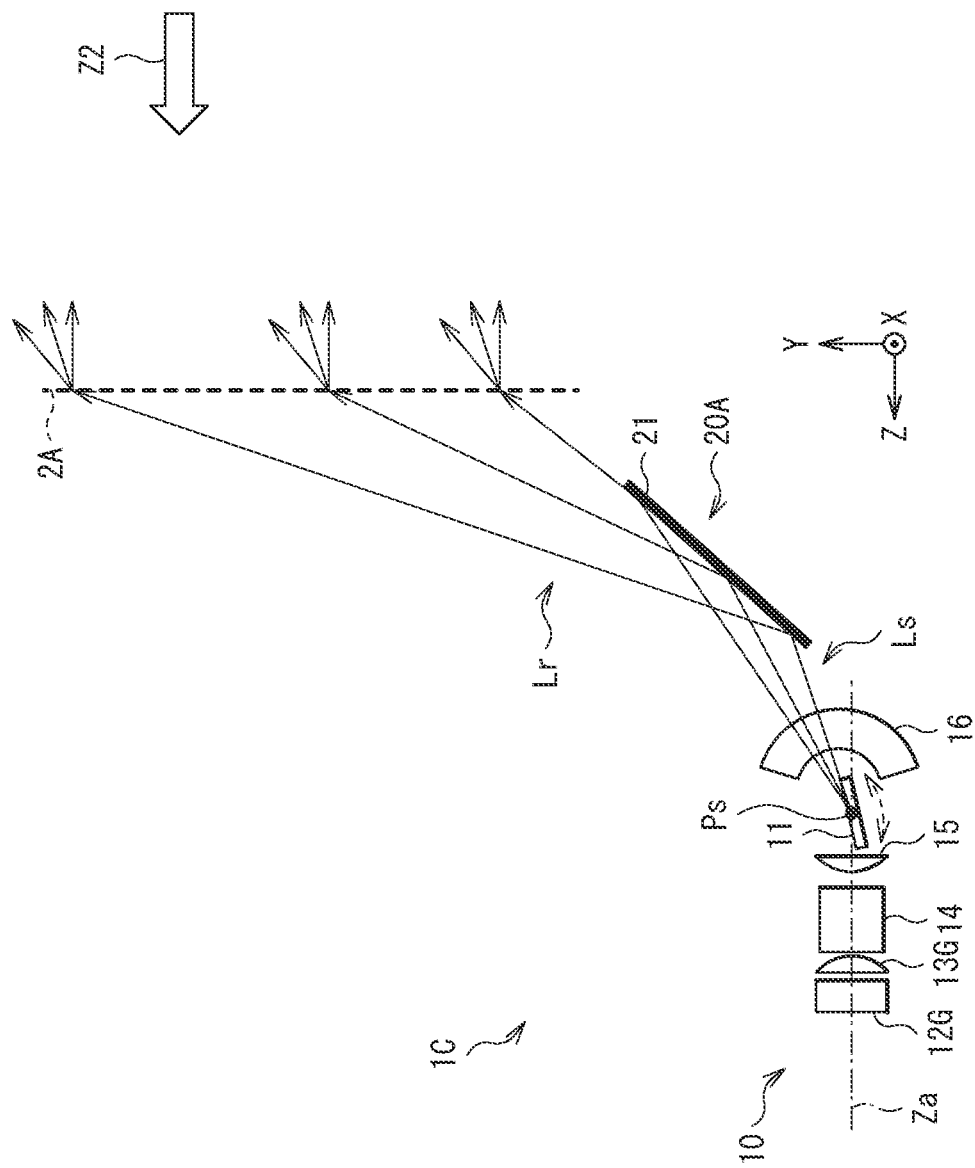
[FIG. 10]

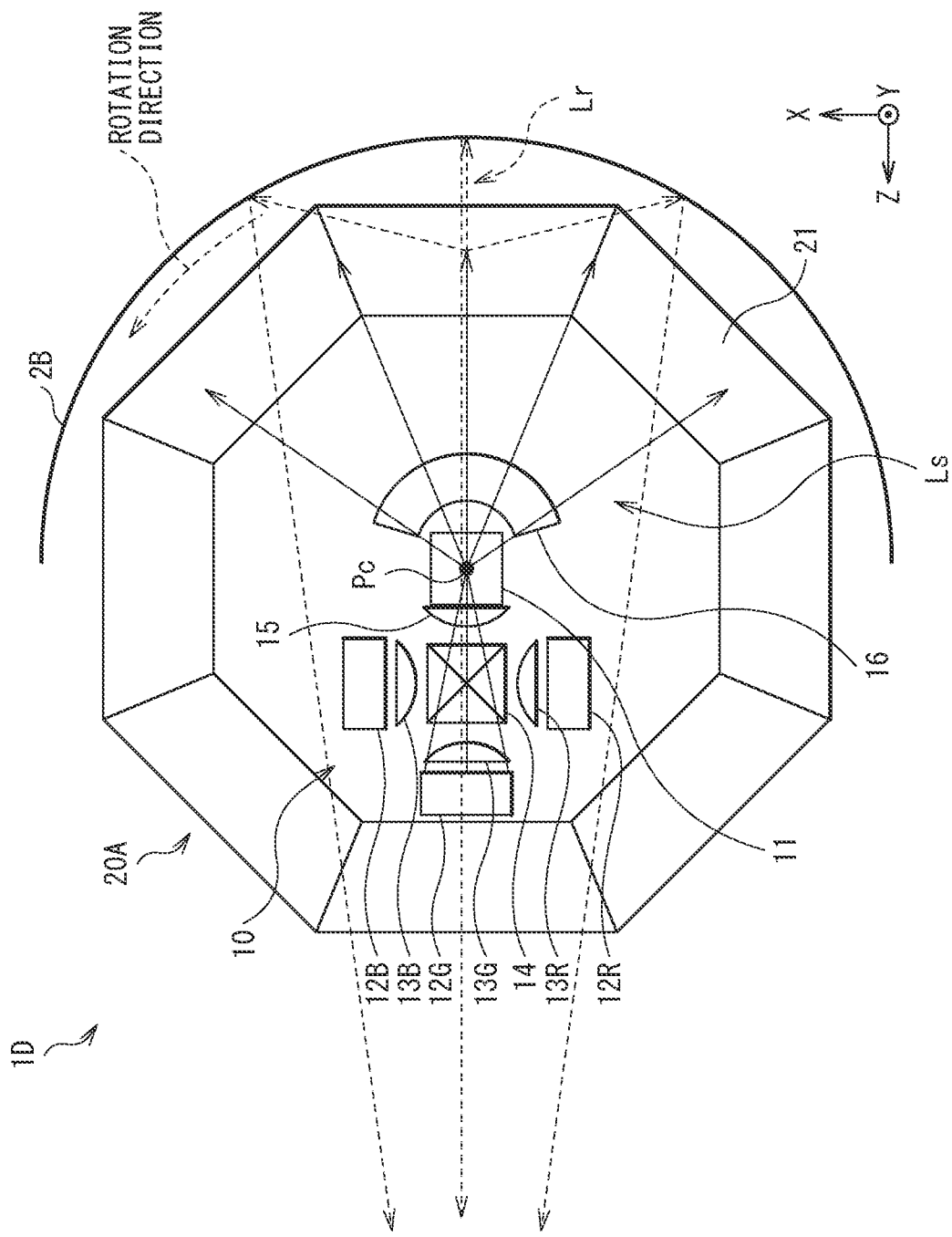
[FIG. 11]

[FIG. 12]
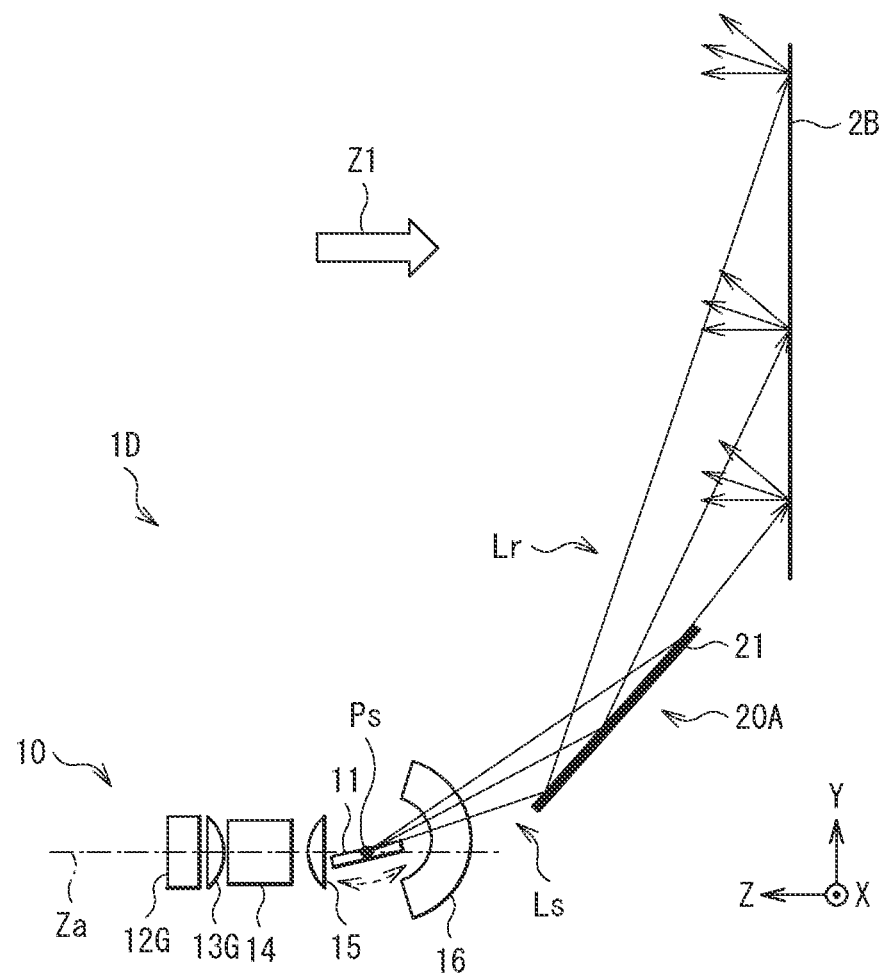

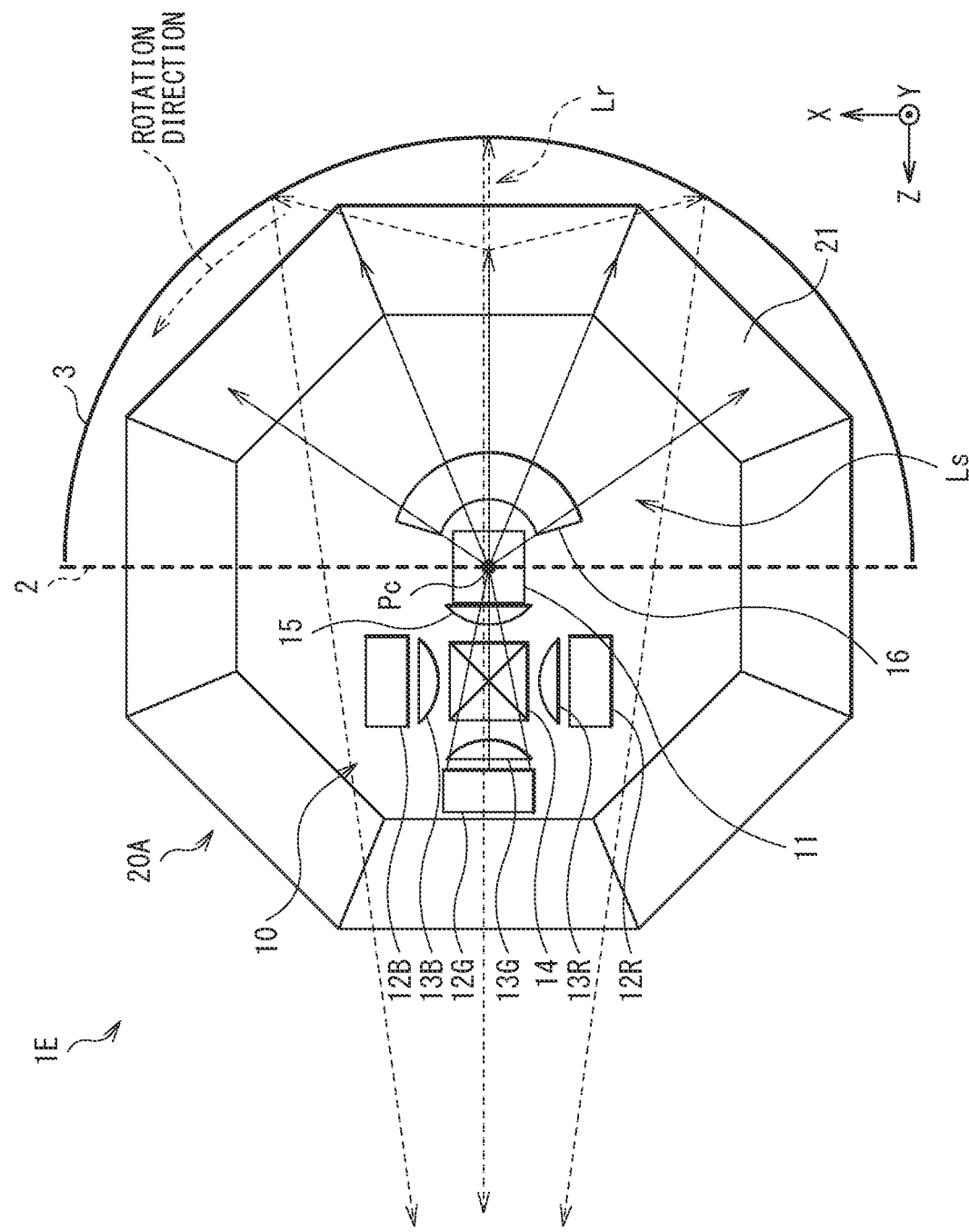
[FIG. 13]

[FIG. 14]
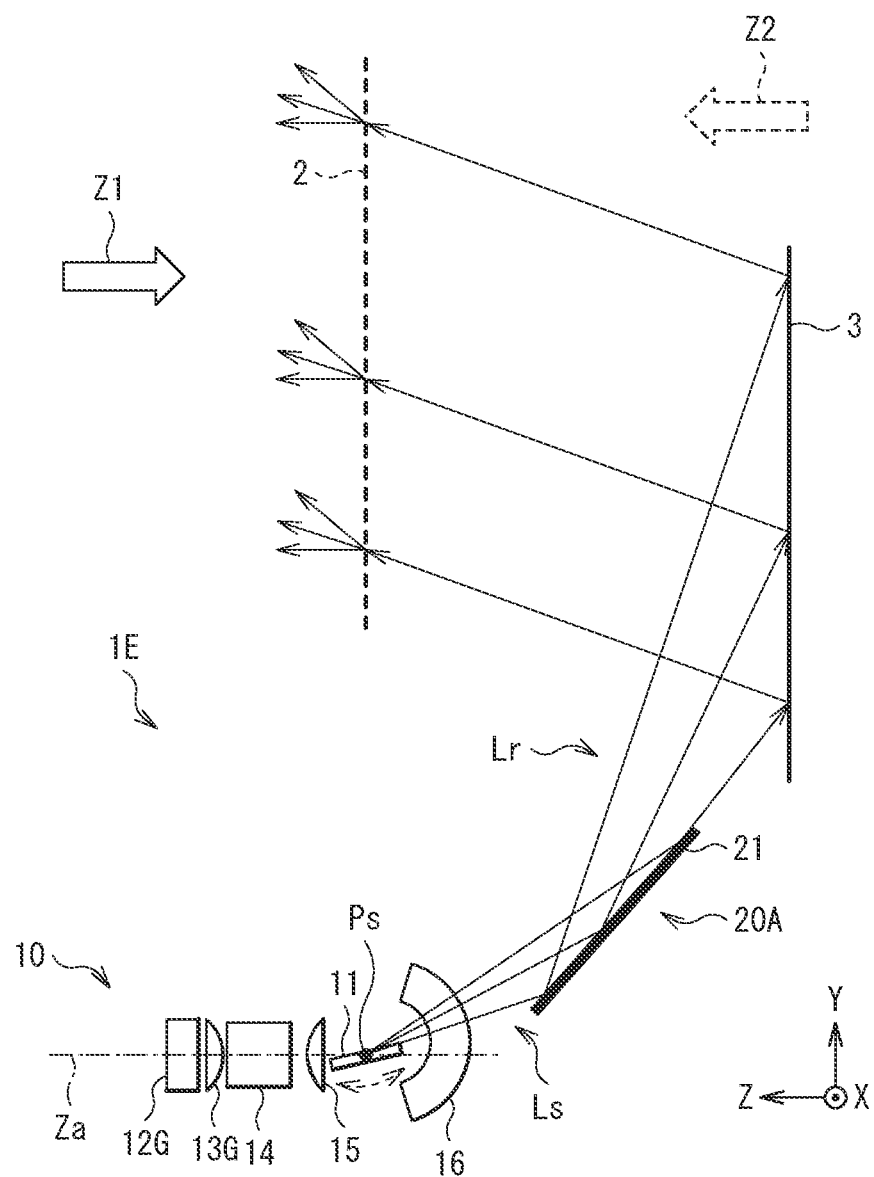

[FIG. 15]
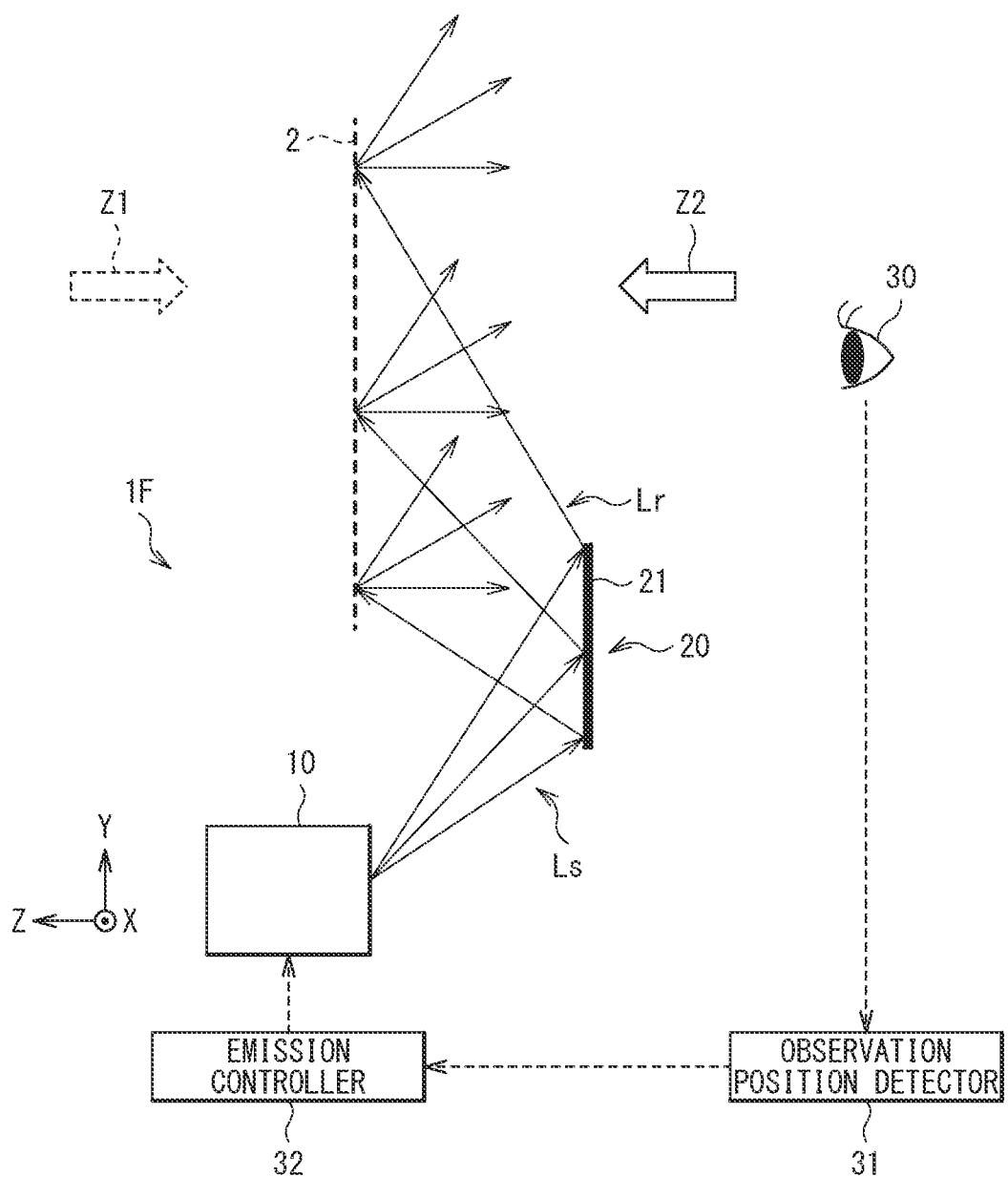

IMAGE DISPLAY APPARATUS

CROSS REFERENCE TO RELATED APPLICATIONS

This application is a U.S. National Phase of International Patent Application No. PCT/JP2019/016600 filed on Apr. 18, 2019, which claims priority benefit of Japanese Patent Application No. JP 2018-100650 filed in the Japan Patent Office on May 25, 2018. Each of the above-referenced applications is hereby incorporated herein by reference in its entirety.

TECHNICAL FIELD

The present disclosure relates to an image display apparatus that displays a plurality of perspective images.

BACKGROUND ART

There is a display technique of a three-dimensional image by displaying a plurality of images (perspective images) seen from different perspectives on the same screen. For example, the display technique involves arranging a plurality of projectors on a circumference, while disposing a screen that diffuses light only in a vertical direction in a center thereof, and then projecting perspective images from the respective plurality of projectors onto the screen at different angles to each other, thereby displaying a three-dimensional image in the center (see PTL 1). In this case, components, such as a drive circuit, a projection optical system, and a display device, which are included in each of the projectors, are disposed on the circumference.

CITATION LIST

Patent Literature

PTL 1: Japanese Unexamined Patent Application Publication No. 2010-32952

SUMMARY OF THE INVENTION

In the above-mentioned technique, the size of the entire image display apparatus increases because of a constraint imposed by an exclusive area for the components of the plurality of projectors. Further, an arrangement pitch between the plurality of projectors is determined depending on the size of the individual projectors, which limits an angular resolution as a factor that determines a display quality of the three-dimensional image in terms of characteristics.

It is desirable to provide an image display apparatus, without increasing its configuration size, that allows for making the angular resolution in a horizontal direction when performing the image display of multiple perspectives equal to or higher than when disposing a plurality of projectors on the circumference.

An image display apparatus according to one embodiment of the present disclosure includes: a beam emitting section that radially emits a plurality of beams in a horizontal direction; a mirror rotary member having a rotation axis and an inner surface, in which the inner surface has a plurality of mirror surfaces that reflects each of the plurality of beams, and the mirror rotary member as a whole rotates about the rotation axis as a center to thereby perform, by the plurality of mirror surfaces, scanning with each of the plurality of beams emitted from the beam emitting section in the horizontal direction; and a screen to be irradiated with the plurality of beams with which the scanning is performed by the plurality of mirror surfaces.

In the image display apparatus according to the embodiment of the present disclosure, the scanning is performed with each of the plurality of beams emitted radially in the horizontal direction, by the plurality of mirror surfaces formed on the inner surface of the mirror rotary member in the horizontal direction, thereby irradiating the screen with the beams.

BRIEF DESCRIPTION OF THE DRAWINGS

FIG. 1 is a configuration diagram illustrating an outline of an image display apparatus according to a comparative example.

FIG. 2 is a top view schematically illustrating a configuration example of an image display apparatus according to a first embodiment of the present disclosure.

FIG. 3 is a side view schematically illustrating the configuration example of the image display apparatus according to the first embodiment.

FIG. 4 is a top view schematically illustrating a state of scanning with one beam in the image display apparatus according to the first embodiment.

FIG. 5 is a top view illustrating the state of the scanning with one beam by a polyhedral mirror rotary member in the image display apparatus according to the first embodiment, together with a state of the rotation of the mirror rotary member.

FIG. 6 is a top view schematically illustrating a first specific configuration example of a beam emitting section in the image display apparatus according to the first embodiment.

FIG. 7 is a side view schematically illustrating the first specific configuration example of the beam emitting section in the image display apparatus according to the first embodiment.

FIG. 8 is a top view schematically illustrating the second specific configuration example of the beam emitting section in the image display apparatus according to the first embodiment.

FIG. 9 is a top view schematically illustrating one configuration example of the image display apparatus according to a second embodiment.

FIG. 10 is a side view schematically illustrating the configuration example of the image display apparatus according to the second embodiment.

FIG. 11 is a top view schematically illustrating a configuration example of an image display apparatus according to a third embodiment.

FIG. 12 is a side view schematically illustrating the configuration example of the image display apparatus according to the third embodiment.

FIG. 13 is a top view schematically illustrating a configuration example of an image display apparatus according to a fourth embodiment.

FIG. 14 is a side view schematically illustrating the configuration example of the image display apparatus according to the fourth embodiment.

FIG. 15 is a side view schematically illustrating a configuration example of an image display apparatus according to a fifth embodiment.

MODES FOR CARRYING OUT THE INVENTION

Hereinafter, embodiments of the present disclosure will be described in detail with reference to figures. It is to be noted that the description is given in the following order.
1. First Embodiment
 1.0 Comparative Example (FIG. 1)
 1.1 Configuration and Operation of Image Display Apparatus According to First Embodiment (FIGS. 2 to 8)
 1.2 Effects
2. Second Embodiment (an image display apparatus using a transmission type cylindrical screen) (FIGS. 9 and 10)
3. Third Embodiment (an image display apparatus using a reflective type cylindrical screen) (FIGS. 11 and 12)
4. Fourth Embodiment (an image display apparatus using a reflective optical device and a screen) (FIGS. 13 and 14)
5. Fifth Embodiment (an image display apparatus including an observation position detector) (FIG. 15)
6. Other Embodiments

1. First Embodiment

1.0 Comparative Example

Outline and Issue of an Image Display Apparatus According to a Comparative Example FIG. 1 illustrates an outline of an image display apparatus according to a comparative example.

The image display apparatus according to the comparative example includes a plurality of projectors 100 arranged on a circumference in an array, and a screen 200 disposed in a center thereof and having an anisotropic diffusion characteristic. A three-dimensional image is displayed by projecting an image from each of the projectors 100 in a direction toward the center.

One projector 100 is, for example, a DMD (Digital Micromirror Device) type MEMS (Micro Electro Mechanical System) projector that produces a projected image using a plurality of movable mirrors arranged two-dimensionally. In this case, the one projector 100 displays a two-dimensional image on the screen 200 by two-dimensional scanning with a laser light source using a MEMS mirror. Thus, in the image display apparatus according to the comparative example, an image light of one perspective is emitted from one projector 100. Thus, to display a plurality of perspective images, multiple projectors 100, the number of which is the number of perspectives, are necessary, resulting in a large-sized device as a whole. In the image display apparatus according to the comparative example, a base point of each projector 100 is on the circumference, and thus it is difficult to reduce the size of the entire device even if the individual projectors 100 are made smaller.

1.1 Configuration and Operation of Image Display Apparatus According to First Embodiment (Outline of an Image Display Apparatus)

FIG. 2 and FIG. 3 schematically illustrate one configuration example of an image display apparatus 1 according to a first embodiment of the present disclosure. FIG. 2 illustrates an example of the entire configuration of the image display apparatus 1 as viewed from a direction of an upper surface thereof. FIG. 3 schematically illustrates a configuration example of the image display apparatus 1 as viewed from a direction of a side surface thereof. In FIG. 2 or the like, an X axis indicates a horizontal direction, a Y axis indicates a vertical direction, and a Z axis indicates a direction orthogonal to the X and Y axes. The same is applied to the figures illustrated in other configuration examples and other embodiments which will be described later.

The image display apparatus 1 according to the first embodiment includes a beam emitting section 10, a polyhedral mirror (polygon mirror) rotator 20, and a screen 2. As illustrated in FIG. 3, for example, the polyhedral mirror rotary member 20 is disposed above the beam emitting section 10. For example, the screen 2 is disposed above the beam emitting section 10 and the polyhedral mirror rotary member 20.

The beam emitting section 10 emits a plurality of beams Ls radially in a horizontal direction toward the inner surface of the polyhedral mirror rotary member 20. As illustrated in FIGS. 6 to 8 to be described later, the beam emitting section 10 has a scanning mirror 11 and performs scanning with each of the plurality of beams Ls in a vertical direction (a direction orthogonal to a radiation plane of each of the plurality of beams Ls). FIG. 3 illustrates a state of scanning with one beam in the vertical direction.

The polyhedral mirror rotary member 20 has a hollow polygonal prism shape and has a rotation axis Pc and an inner surface. The rotation axis Pc is an axis parallel to the Z axis. A plurality of mirror surfaces 21 is provided on the inner surface of the polyhedral mirror rotary member 20. The plurality of mirror surfaces 21 reflects the respective plurality of beams Ls emitted from the beam emitting section 10 toward the screen 2. Each of the plurality of mirror surfaces 21 is a surface parallel to the rotation axis Pc. The polyhedral mirror rotary member 20 as a whole rotates about the rotation axis Pc as the center to thereby perform, by the plurality of mirror surfaces 21, scanning with each of the plurality of beams Ls emitted from the beam emitting section 10 toward the screen 2 in the horizontal direction. It is noted that FIG. 2 illustrates an example in which a rotation direction of the polyhedral mirror rotary member 20 is counterclockwise (left-handed) as viewed from above, but it may also be clockwise (right-handed). The same is applied to other configuration examples and other embodiments, which will be described later.

It is noted that in FIG. 2, the polyhedral mirror rotary member 20 is illustrated to have a regular octahedral shape with eight mirror surfaces 21, but it may have a polyhedral shape other than the regular octahedral shape. The number of mirror surfaces 21 may be more or less than eight.

Further, in FIG. 2, five beams Ls1, Ls2, Ls3, Ls4, and Ls5 are illustrated as the plurality of beams Ls emitted from the beam emitting section 10. However, the number of the plurality of beams Ls is not limited to five, and may be greater than or equal to six, or less than or equal to four. In the image display apparatus 1, image display corresponding to one perspective is performed by one beam out of the plurality of beams Ls. The screen 2 is irradiated with the plurality of beams Lr reflected by the plurality of mirror surfaces 21 of the polyhedral mirror rotary member 20 and with which the scanning is performed by the mirror surfaces 21. In this way, the image display based on a plurality of perspectives is performed. The beams, the number of which is the same as the number of necessary perspectives, may only be emitted from the beam emitting section 10.

The screen 2 is, for example, a transmission or reflective type planar screen having an anisotropic diffusion characteristic with different light diffusion characteristics in the horizontal and vertical directions. The screen 2 is disposed, for example, substantially in the center of the polyhedral mirror rotary member 20 as viewed from a direction parallel to the rotation axis Pc. The screen 2 may be a curved screen that has a curvature in the horizontal direction.

The screen 2 may be a diffractive device that has an anisotropic diffusion characteristic with different light diffusion characteristics in the horizontal and vertical directions. The diffractive device may be a holographic optical element (HOE: Holographic Optical Element). The screen 2 desirably has the anisotropic diffusion characteristic, for example, relatively narrow diffusion in the horizontal direction and relatively wide diffusion in the vertical direction. By making the diffusion narrow in the horizontal direction, it is possible to prevent a plurality of perspective images projected from different angles from being unnecessarily blended together.

It is noted that in FIG. 3, Z1 indicates a direction of observation in a case where the screen 2 is of a transmission type. Z2 indicates a direction of observation in a case where the screen 2 is of a reflective type.

FIG. 4 schematically illustrates a state of scanning with one beam Ls by a polyhedral mirror rotary member 20 in the image display apparatus 1. FIG. 5 illustrates a state of the scanning with the one beam Ls together with a state of rotation of the polyhedral mirror rotary member 20.

For one beam Ls emitted from the beam emitting section 10, the direction of reflection of the beam Ls in the horizontal direction by the mirror surface 21 of the polyhedral mirror rotary member 20 changes depending on the rotational position of the polyhedral mirror rotary member 20. For example, as illustrated in FIG. 5, when the rotational position of the polyhedral mirror rotary member 20 changes in the order of time elapse of time t1, t2 and t3, one beam Ls emitted from the beam emitting section 10 changes the direction of its reflection as in beams Lr1, Lr2, and Lr3. Thus, as illustrated in FIG. 4, the screen 2 is scanned with one beam Ls (beams Lr1, Lr2, and Lr3) in the horizontal direction. Further, the interior of the beam emitting section 10 is scanned with one beam Ls in the vertical direction. As a result of this raster scanning in the horizontal and vertical directions, two-dimensional image display corresponding to one perspective is performed by one beam Ls on the screen 2.

Therefore, the image display apparatus 1 enables the image display similar to that in the image display apparatus according to the comparative example illustrated in FIG. 1. The individual beams Ls for the scanning in the polyhedral mirror rotary member 20 are substantially equivalent to those in a state where a plurality of projectors is arranged on a circumference assuming that any position of the inner surface of the polyhedral mirror rotary member 20 is on the circumference. On the screen 2, the two-dimensional image is formed for each of the individual beams Ls. This allows the image display apparatus 1 to present different types of angular information regarding a plurality of beams Ls in the horizontal direction, the number of the types of information being the same as the number of beams Ls.

As a specific example, in a case where the polyhedral mirror rotary member 20 is formed by a regular octahedron, a swing angle in the horizontal direction (horizontal scanning angle) of one beam Ls by the polyhedral mirror rotary member 20 is 90°. When the raster scanning is performed at 60 Hz, a rotation speed of the polyhedral mirror rotary member 20 is 3600/8=450 rpm.

For example, 60 beams as the plurality of beams Ls are emitted from the beam emitting section 10 radially at intervals of 2° within a range of 120°. In this case, for example, the HOE with an anisotropic diffusion characteristic of 2° in the horizontal direction and 30° in the vertical direction is used as the screen 2.

Specific Configuration Example of Beam Emitting Section 10

FIG. 6 and FIG. 7 schematically illustrate a first specific configuration example of the beam emitting section 10. FIG. 6 illustrates a state of the image display apparatus 1A including the beam emitting section 10, according to the first specific configuration example as viewed from a direction of an upper surface thereof. FIG. 7 illustrates a state of the image display apparatus 1A as viewed from a direction of a side surface thereof.

FIGS. 6 and 7 illustrate the configuration example of the image display apparatus 1A that performs full-color display. It is noted that the configurations of the polyhedral mirror rotary member 20 and the screen 2 are the same as those in the image display apparatus 1 illustrated in FIGS. 2 and 3.

In the image display apparatus 1A, the beam emitting section 10 includes the scanning mirror 11, a light source 12 (12R, 12G, and 12B), a condenser lens 13 (13R, 13G, and 13B), a dichroic prism 14, a condenser lens 15, and a wide-angle lens 16.

A light source 12R is a laser light source that emits a plurality of beams Ls in R (red) color. A light source 12G is a laser light source that emits a plurality of beams Ls in G (green) color. A light source 12B is a laser light source that emits a plurality of beams Ls in B (blue) color. Each of the light source 12R, the light source 12G, and the light source 12B includes, for example, an edge-emitting laser array or VCSEL (Vertical Cavity Surface Emitting Laser). In FIGS. 6 and 7, only a plurality of green beams Ls from the light source 12G are illustrated as representative.

The condenser lens 13 (13R, 13G, and 13B) and the condenser lens 15 configure a condensing optical system that condenses each of the plurality of beams Ls in each color emitted from the light source 12 (12R, 12G, and 12B) toward the scanning mirror 11.

The condenser lens 13R condenses the plurality of red beams Ls from the light source 12R. The condenser lens 13G condenses the plurality of green beams Ls from the light source 12G. The condenser lens 13B condenses the plurality of blue beams Ls from the light source 12B.

The dichroic prism 14 has a plurality of surfaces. The light source 12R and the condenser lens 13R are disposed to face a first surface of the dichroic prism 14. The light source 12G and the condenser lens 13G are disposed to face a second surface of the dichroic prism 14. The light source 12B and the condenser lens 13B are disposed to face a third surface of the dichroic prism 14.

The dichroic prism 14 combines optical paths of the plurality of red beams Ls entering the first surface, optical paths of the plurality of green beams Ls entering the second surface, and optical paths of the plurality of blue beams Ls entering the third surface, thereby outputting the plurality of beams Ls in each color from a fourth surface toward the scanning mirror 11.

The condenser lens 15 condenses the plurality of beams Ls in each color outputted from the dichroic prism 14 toward the scanning mirror 11.

The scanning mirror 11 performs scanning with each of the plurality of beams Ls in each color in the vertical direction (the direction orthogonal to the radiation plane of the plurality of beams Ls) toward the inner surface of the polyhedral mirror rotary member 21. The scanning mirror 11 is a single one-dimensional scanning mirror, for example, a one-dimensional MEMS mirror. As illustrated in FIG. 7, the base point Ps for scanning in the vertical direction by the scanning mirror 11 is on an optical axis Za of the condensing optical system (the condenser lens 13 (13R, 13G, and 13B) and the condenser lens 15).

The wide-angle lens 16 is an output optical system that radially expands a plurality of beams Ls in each color, with which the scanning is performed by the scanning mirror 11, to a range of wider angles in the horizontal direction, and outputs the radially-expanded plurality of beams Ls toward the inner surface of the polyhedral mirror rotary member 21.

FIG. 8 schematically illustrates a second specific configuration example of the beam emitting section 10. FIG. 8 illustrates a state of an image display apparatus 1B including the beam emitting section 10 according to the second specific configuration example as viewed from a direction of an upper surface thereof.

FIG. 8 more specifically illustrates a configuration of the output optical system (the wide-angle lens 16) in the beam emitting section 10 according to the first specific configuration example illustrated in FIGS. 6 and 7 and simply illustrates other constituent portions for explanatory purposes. FIG. 8 omits the illustration of the dichroic prism 14 and the condenser lens 15, while illustrating the configuration including only one light source 12 for simplicity. One condenser lens 13, the scanning mirror 11, and the wide-angle lens 16 are disposed on the light paths of the plurality of beams Ls emitted from the light source 12. The wide-angle lens 16 has a plurality of lenses.

As illustrated in FIG. 8, in the beam emitting section 10, an aperture St for the condensing optical system (the condenser lens 13) and the output optical system (the wide-angle lens 16) is desirably disposed in the vicinity of the scanning mirror 11. Likewise, in the configuration example of FIGS. 6 and 7, the aperture St for the condensing optical system (the condenser lens 13 (13R, 13G, and 13B) and the condenser lens 15) and the output optical system (the wide-angle lens 16) is desirably disposed in the vicinity of the scanning mirror 11.

In the configuration example of FIG. 8, a radiation center of each of the plurality of beams Ls in the beam emitting section 10 is desirably present on the rotation axis Pc. The same is applied to the configuration example of FIGS. 6 and 7.

In the configuration example of FIGS. 6 and 7 and the configuration example of FIG. 8, the condensing optical system and the output optical system are desirably configured such that the beam diameter of each of the plurality of beams Ls is minimized on the screen 2. Thus, the condensing optical system and the output optical system are desirably optimized as a whole of the optical system such that the plurality of beams Ls form images on the cylinder surface 40 that substantially coincides with the polyhedral mirror rotary member 20.

1.2 Effects

As described above, according to the image display apparatus of the first embodiment, the scanning is performed with each of the plurality of beams Ls emitted radially in the horizontal direction, by the plurality of mirror surfaces 21 formed on the inner surface of the polyhedral mirror rotary member 20, thereby irradiating the screen 2 with the beams. This allows for making the angular resolution in the horizontal direction when performing the image display of multiple perspectives equal to or higher than when disposing a plurality of projectors on the circumference, without increasing the size of the configuration of the image display apparatus.

It is noted that the effects described in the present specification are illustrative only and not intended to be limiting, and there may be other effects as well. The same is applied to effects of other embodiments to be described later.

2. Second Embodiment

Next, the image display apparatus according to a second embodiment of the present disclosure will be described. Hereinafter, substantially the same portions as the components of the image display apparatus according to the above-described first embodiment are denoted by the same reference characters and their description will be omitted as appropriate.

FIG. 9 and FIG. 10 schematically illustrate one configuration example of an image display apparatus 1C according to the second embodiment of the present disclosure. FIG. 9 illustrates an example of the entire configuration of the image display apparatus 1C as viewed from a direction of an upper surface thereof. FIG. 10 schematically illustrates one configuration example of the image display apparatus 1C as viewed from a direction of a side surface thereof.

The image display apparatus 1C according to the second embodiment includes a polyhedral mirror rotary member 20A and a transmission type cylindrical screen 2A, instead of the polyhedral mirror rotary member 20 and the screen 2 in the image display apparatus according to the above-described first embodiment.

The polyhedral mirror rotary member 20A has a hollow, pyramidal shape and has a rotation axis Pc and an inner surface. The rotation axis Pc is an axis parallel to the Z axis. A plurality of mirror surfaces 21 is provided on the inner surface of the polyhedral mirror rotary member 20A. The plurality of mirror surfaces 21 reflects the respective plurality of beams Ls emitted from the beam emitting section 10 toward the transmission type cylindrical screen 2A. Each of the plurality of mirror surfaces 21 is a surface inclined with respect to the rotation axis Pc. The polyhedral mirror rotary member 20A as a whole rotates about the rotation axis Pc as the center to thereby perform scanning with each of the plurality of beams Ls emitted from the beam emitting section 10 in the horizontal direction toward the transmission type cylindrical screen 2A by the plurality of mirror surfaces 21.

The transmission type cylindrical screen 2A is disposed around at least a portion of the polyhedral mirror rotary member 20A as viewed from a direction parallel to the rotation axis Pc.

The transmission type cylindrical screen 2A may be a diffractive device that has an anisotropic diffusion characteristic with different light diffusion characteristics in the horizontal and vertical directions. The diffractive device may be the HOE. The transmission type cylindrical screen 2A desirably has the anisotropic diffusion characteristic, for example, relatively narrow diffusion in the horizontal direction and relatively wide diffusion in the vertical direction. By making the diffusion narrow in the horizontal direction, it is possible to prevent a plurality of perspective images projected from different angles from being unnecessarily blended together.

It is noted that Z2 indicates a direction of observation in FIG. 10.

Other configurations, operations, and effects may be substantially similar to those of the image display apparatus according to the above-described first embodiment.

3. Third Embodiment

Next, an image display apparatus according to a third embodiment of the present disclosure will be described. Hereinafter, substantially the same portions as the components of the image display apparatus according to the above-described first or second embodiment are denoted by the same reference characters and their description will be omitted as appropriate.

FIG. 11 and FIG. 12 schematically illustrate one configuration example of an image display apparatus 1D according to the third embodiment of the present disclosure. FIG. 11 illustrates an example of the entire configuration of the image display apparatus 1D as viewed from a direction of an upper surface thereof. FIG. 12 schematically illustrates one configuration example of the image display apparatus 1D as viewed from a direction of a side surface thereof.

The image display apparatus 1D according to the third embodiment includes a polyhedral mirror rotary member 20A, which is similar to that in the image display apparatus 1C according to the above-described second embodiment. However, the reflective type cylindrical screen 2B is included, instead of the transmission type cylindrical screen 2A in the image display apparatus 1C according to the above-described second embodiment.

A plurality of mirror surfaces 21 is provided on the inner surface of the polyhedral mirror rotary member 20A. The plurality of mirror surfaces 21 reflects the respective plurality of beams Ls emitted from the beam emitting section 10 toward the reflective type cylindrical screen 2B. Each of the plurality of mirror surfaces 21 is a surface inclined with respect to the rotation axis Pc. The polyhedral mirror rotary member 20A as a whole rotates about the rotation axis Pc as the center to thereby perform, by the plurality of mirror surfaces 21, scanning with each of the plurality of beams Ls emitted from the beam emitting section 10 in the horizontal direction toward the reflective type cylindrical screen 2B.

The reflective type cylindrical screen 2B is disposed in a portion around the polyhedral mirror rotary member 20A as viewed from a direction parallel to the rotation axis Pc.

The reflective type cylindrical screen 2B may be a diffractive device that has anisotropic diffusion characteristic with different light diffusion characteristics in the horizontal and vertical directions. The diffractive device may be the HOE. The reflective type cylindrical screen 2B desirably has the anisotropic diffusion characteristic, for example, relatively narrow diffusion in the horizontal direction and relatively wide diffusion in the vertical direction. By making the diffusion narrow in the horizontal direction, it is possible to prevent a plurality of perspective images projected from different angles from being unnecessarily blended together.

It is noted that Z1 indicates a direction of observation in FIG. 12.

In the image display apparatus 1D, the reflective type cylindrical screen 2B is a cylindrical reflective surface and functions as a concave mirror in the horizontal direction as viewed from the direction of observation Z1. By appropriately setting a distance between the polyhedral mirror rotary member 20A and the cylinder surface of the reflective type cylindrical screen 2B, each of the plurality of beams Ls is condensed at an assumed viewing position.

Other configurations, operations, and effects may be substantially similar to those of the image display apparatus according to the above-described first or second embodiment.

4. Fourth Embodiment

Next, an image display apparatus according to a fourth embodiment of the present disclosure will be described. Hereinafter, substantially the same portions as the components of the image display apparatus according to any one of the above-described first to third embodiments are denoted by the same reference characters and their description will be omitted as appropriate.

FIG. 13 and FIG. 14 schematically illustrate one configuration example of an image display apparatus 1E according to a fourth embodiment of the present disclosure. FIG. 13 illustrates an example of the entire configuration of the image display apparatus 1E as viewed from a direction of an upper surface thereof. FIG. 14 schematically illustrates one configuration example of the image display apparatus 1E as viewed from a direction of a side surface thereof.

The image display apparatus 1E according to the fourth embodiment includes a polyhedral mirror rotary member 20A, which is similar to that in the image display apparatus 1D according to the above-described third embodiment. However, the image display apparatus 1E according to the fourth embodiment includes the screen 2 and a reflective optical device 3, instead of the reflective type cylindrical screen 2B in the image display apparatus 1D according to the above-described third embodiment.

The image display apparatus 1E according to the fourth embodiment is configured to separate a function of the concave mirror of the reflective type cylindrical screen 2B in the image display apparatus 1D according to the third embodiment from a function of the screen having the anisotropic diffusion characteristic.

The reflective optical device 3 has the cylindrical reflective surface and is disposed in a portion around the polyhedral mirror rotary member 20A as viewed from a direction parallel to the rotation axis Pc. The reflective optical device 3 is, for example, a HOE reflective lens. The reflective optical device 3 reflects, by the cylindrical reflective surface, the plurality of beams Ls, with which the scanning is performed by the plurality of mirror surfaces 21 of the polyhedral mirror rotary member 20, toward the screen 2.

Like the image display apparatus according to the above-described first embodiment, the screen 2 is, for example, a transmission or reflective type planar screen having an anisotropic diffusion characteristic with different light diffusion characteristics in the horizontal and vertical directions. The screen 2 is disposed, for example, substantially in the center of the polyhedral mirror rotary member 20 as viewed from the direction parallel to the rotation axis Pc. The screen 2 may be a curved screen that has a curvature in the horizontal direction.

It is noted that in FIG. 14, Z1 indicates a direction of observation in a case where the screen 2 is of a transmission type. Z2 indicates a direction of observation in a case where the screen 2 is of a reflective type.

Instead of the screen 2, a configuration having a transmission type screen function imparted to an opposing surface side of the reflective optical device 3 may be used.

Other configurations, operations, and effects may be substantially similar to those of the image display apparatuses according to the above-described first to third embodiments.

5. Fifth Embodiment

Next, an image display apparatus according to a fifth embodiment of the present disclosure will be described. Hereinafter, substantially the same portions as the components of the image display apparatus according to any one of the above-described first to fourth embodiments are denoted by the same reference characters and their description will be omitted as appropriate.

FIG. 15 schematically illustrates a configuration example of an image display apparatus 1F according to the fifth embodiment as viewed from a direction of a side surface thereof.

Since the image display apparatus according to each of the above-described first to fourth embodiments does not have a parallax in the vertical direction, it may not be able to appropriately display a three-dimensional image when the perspective moves from an optimal viewing position in the vertical direction. To avoid this situation, a function of detecting an observation position of an observer may be added to the image display apparatus, and a plurality of beams Ls emitted from the beam emitting section 10 may be controlled such that a three-dimensional image is appropriately displayed on the basis of the detected observation position.

FIG. 15 illustrates a configuration example in which the image display apparatus further includes an observation position detector 30 and an emission controller 32 with respect to the image display apparatus 1 according to the above-described first embodiment. The image display apparatuses of the above-described second to fourth embodiments may also have the similar configuration.

The observation position detector 30 detects, for example, a position of eyes 30 of an observer (a perspective position) in the vertical direction, as the observation position in the vertical direction.

The emission controller 32 controls the beam emitting section 10 on the basis of the observation position in the vertical direction detected by the observation position detector 30. The emission controller 32 controls the state of the plurality of beams Ls, for example, by controlling the scanning mirror 11 and the light source 12 (12R, 12G, and 12B) so that the three-dimensional image is appropriately displayed regardless of the observation position in the vertical direction.

Modified Example

It is possible for the image display apparatuses according to the above-described first to fourth embodiments to display a three-dimensional image with less blur by increasing the number of the plurality of beams Ls radiated in the horizontal direction and increasing a light ray density. However, when the number of beams increases, the amount of information handled in the image display apparatus may possibly expand. Thus, the observation position in the horizontal direction may also be detected by the observation position detector 30. It is possible to reduce the amount of information by handling only information regarding the light ray that enters observer's left and right eyes on the basis of a detected result of the observation position in the horizontal direction. The emission controller 32 may cause the beam emitting section 10 to emit only the beam that enter the observer's left and right eyes as the plurality of beams Ls.

Other configurations, operations, and effects may be substantially similar to those of the image display apparatuses according to the above-described first to fourth embodiments.

6. Other Embodiments

A technique according to the present disclosure is not limited to the description of the above respective embodiments and various modifications can be made to these embodiments.

It is possible for the present technology to also have, for example, the following configurations.

According to the present technology with the following configuration, the scanning is performed with each of the plurality of beams emitted radially in the horizontal direction, by the plurality of mirror surfaces formed on the inner surface of the mirror rotary member, thereby irradiating the screen with the beams. This makes it possible to render the angular resolution in the horizontal direction when performing the image display of multiple perspectives equal to or higher than when disposing a plurality of projectors on the circumference, without increasing the size of the configuration of the image display apparatus.

(1)

An image display apparatus including:

a beam emitting section that radially emits a plurality of beams in a horizontal direction;

a mirror rotary member having a rotation axis and an inner surface, the inner surface having a plurality of mirror surfaces that reflects each of the plurality of beams, the mirror rotary member as a whole rotating about the rotation axis as a center to thereby perform, by the plurality of mirror surfaces, scanning with each of the plurality of beams emitted from the beam emitting section in the horizontal direction; and a screen to be irradiated with the plurality of beams with which the scanning is performed by the plurality of mirror surfaces.

(2)

The image display apparatus according to (1) described above, in which the beam emitting section includes:

a light source that emits the plurality of beams; and a scanning mirror that performs scanning with each of the plurality of beams emitted from the light source in a vertical direction toward the inner surface of the mirror rotary member.

(3)

The image display apparatus according to (2) described above, in which the beam emitting section further includes an output optical system that radially expands the plurality of beams, with which the scanning is performed by the scanning mirror, to a range of wider angles in the horizontal direction, and outputs the radially-expanded plurality of beams.

(4)

The image display apparatus according to (2) described above, in which the beam emitting section further includes a condensing optical system that condenses each of the plurality of beams emitted from the light source toward the scanning mirror.

(5)

The image display apparatus according to (4) described above, in which, in the beam emitting section, an aperture for the condensing optical system and the output optical system is disposed in a vicinity of the scanning mirror, and the condensing optical system and the output optical system cause a beam diameter of each of the plurality of beams to be minimized on the screen.

(6)

The image display apparatus according to any one of (1) to (5) described above, in which a radiation center of each of the plurality of beams in the beam emitting section is present on the rotation axis.

(7)

The image display apparatus according to any one of (1) to (6) described above, in which the screen includes a planar screen or a curved screen, the planar screen or the curved screen being of a transmission type or a reflective type and having an anisotropic diffusion characteristic with different light diffusion characteristics in the horizontal direction and a vertical direction.

(8)

The image display apparatus according to (7) described above, in which the screen has the anisotropic diffusion characteristic with relatively narrow diffusion in the horizontal direction compared to in the vertical direction, and relatively wide diffusion in the vertical direction compared to in the horizontal direction.

(9)

The image display apparatus according to any one of (1) to (8) described above, in which the mirror rotary member has a hollow polygonal prism shape, and each of the plurality of mirror surfaces includes a surface parallel to the rotation axis.

(10)

The image display apparatus according to any one of (1) to (8) described above, in which the mirror rotary member has a hollow pyramidal shape, and each of the plurality of mirror surfaces includes a surface inclined with respect to the rotation axis.

(11)

The image display apparatus according to (10) described above, in which the screen includes a cylindrical screen disposed around at least a portion of the mirror rotary member as viewed from a direction parallel to the rotation axis.

(12)

The image display apparatus according to (10) described above, further including a reflective optical device having a cylindrical reflective surface and disposed in a portion around the mirror rotary member as viewed from a direction parallel to the rotation axis, the reflective optical device reflecting, by the reflective surface, the plurality of beams, with which the scanning is performed by the plurality of mirror surfaces, toward the screen.

(13)

The image display apparatus according to any one of (1) to (12) described above, further including:

a detector that detects an observation position; and a controller that controls the beam emitting section on a basis of the observation position detected by the detector.

(14)

The image display apparatus according to any one of (1) to (13) described above, in which image display based on a plurality of perspectives is performed by irradiating the screen with the plurality of beams.

(15)

The image display apparatus according to (14) described above, in which image display corresponding to one perspective is performed by one of the plurality of beams.

The present application claims the priority on the basis of Japanese Patent Application No. 2018-100650 filed with Japan Patent Office on May 25, 2018, the entire contents of which are incorporated in the present application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image display apparatus comprising:
a beam emitting section that radially emits a plurality of beams in a horizontal direction;
a mirror rotary member having a rotation axis and an inner surface, the inner surface having a plurality of mirror surfaces that reflects each of the plurality of beams, the mirror rotary member as a whole rotating about the rotation axis as a center to thereby perform, by the plurality of mirror surfaces, scanning with each of the plurality of beams emitted from the beam emitting section in the horizontal direction; and
a screen to be irradiated with the plurality of beams with which the scanning is performed by the plurality of mirror surfaces.

2. The image display apparatus according to claim 1, wherein the beam emitting section includes:
a light source that emits the plurality of beams; and
a scanning mirror that performs scanning with each of the plurality of beams emitted from the light source in a vertical direction toward the inner surface of the mirror rotary member.

3. The image display apparatus according to claim 2, wherein the beam emitting section further includes an output optical system that radially expands the plurality of beams, with which the scanning is performed by the scanning mirror, to a range of wider angles in the horizontal direction, and outputs the radially-expanded plurality of beams.

4. The image display apparatus according to claim 2, wherein the beam emitting section further includes a condensing optical system that condenses each of the plurality of beams emitted from the light source toward the scanning mirror.

5. The image display apparatus according to claim 4, wherein, in the beam emitting section,
an aperture for the condensing optical system and the output optical system is disposed in a vicinity of the scanning mirror, and
the condensing optical system and the output optical system cause a beam diameter of each of the plurality of beams to be minimized on the screen.

6. The image display apparatus according to claim 1, wherein a radiation center of each of the plurality of beams in the beam emitting section is present on the rotation axis.

7. The image display apparatus according to claim 1, wherein the screen comprises a planar screen or a curved screen, the planar screen or the curved screen being of a transmission type or a reflective type and having an anisotropic diffusion characteristic with different light diffusion characteristics in the horizontal direction and a vertical direction.

8. The image display apparatus according to claim 7, wherein the screen has the anisotropic diffusion characteristic with relatively narrow diffusion in the horizontal direction compared to in the vertical direction, and relatively wide diffusion in the vertical direction compared to in the horizontal direction.

9. The image display apparatus according to claim 1, wherein
the mirror rotary member has a hollow polygonal prism shape, and
each of the plurality of mirror surfaces comprises a surface parallel to the rotation axis.

10. The image display apparatus according to claim 1, wherein
the mirror rotary member has a hollow pyramidal shape, and
each of the plurality of mirror surfaces comprises a surface inclined with respect to the rotation axis.

11. The image display apparatus according to claim 10, wherein the screen comprises a cylindrical screen disposed around at least a portion of the mirror rotary member as viewed from a direction parallel to the rotation axis.

12. The image display apparatus according to claim 10, further comprising a reflective optical device having a cylindrical reflective surface and disposed in a portion around the mirror rotary member as viewed from a direction parallel to the rotation axis,
the reflective optical device reflecting, by the reflective surface, the plurality of beams, with which the scanning is performed by the plurality of mirror surfaces, toward the screen.

13. The image display apparatus according to claim 1, further comprising:
a detector that detects an observation position; and
a controller that controls the beam emitting section on a basis of the observation position detected by the detector.

14. The image display apparatus according to claim 1, wherein image display based on a plurality of perspectives is performed by irradiating the screen with the plurality of beams.

15. The image display apparatus according to claim 14, wherein image display corresponding to one perspective is performed by one of the plurality of beams.

* * * * *